(12) United States Patent
Toji et al.

(10) Patent No.: US 7,173,660 B2
(45) Date of Patent: Feb. 6, 2007

(54) METHOD FOR DISPLAYING AN INFORMATION IMAGE ON A SCREEN

(75) Inventors: Shigeo Toji, Saitama (JP); Hiroshi Shimaya, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 641 days.

(21) Appl. No.: 09/955,427

(22) Filed: Sep. 19, 2001

(65) Prior Publication Data

US 2002/0033895 A1     Mar. 21, 2002

(30) Foreign Application Priority Data

Sep. 19, 2000 (JP) ............................. 2000-282977

(51) Int. Cl.
*H04N 5/222* (2006.01)

(52) U.S. Cl. ............................. 348/333.02; 348/222.1; 348/333.01; 348/333.12; 382/258; 382/264; 382/266; 382/294; 382/298; 382/299; 382/300; 382/301

(58) Field of Classification Search ............................. 348/333.01–333.14, 230, 341, 222.1, 230.1; 382/258, 264, 266, 293–301
See application file for complete search history.

(56) References Cited

U.S. PATENT DOCUMENTS

| | | | | |
|---|---|---|---|---|
| 5,239,625 A | * | 8/1993 | Bogart et al. | 345/428 |
| 5,264,939 A | * | 11/1993 | Chang | 348/322 |
| 6,014,170 A | * | 1/2000 | Pont et al. | 348/231.4 |
| 6,151,421 A | * | 11/2000 | Yamada | 382/284 |
| 6,157,749 A | * | 12/2000 | Miyake | 382/300 |
| 6,411,745 B1 | * | 6/2002 | Tai et al. | 382/300 |
| 6,536,960 B2 | * | 3/2003 | Kubo et al. | 396/355 |
| 6,556,243 B1 | * | 4/2003 | Dotsubo et al. | 348/231.2 |
| 6,593,965 B1 | * | 7/2003 | Miyamoto | 348/280 |
| 6,661,451 B1 | * | 12/2003 | Kijima et al. | 348/220.1 |

\* cited by examiner

*Primary Examiner*—Vivek Srivastava
*Assistant Examiner*—Chriss S. Yoder
(74) *Attorney, Agent, or Firm*—Birch, Stewart, Kolasch & Birch, LLP

(57) ABSTRACT

For an image to be displayed on a liquid crystal display, a thinning process is executed to reduce a number of pixels constructing the image. An original image of an information image is produced in accordance with a pixel number of a taken subject image. A low-pass-filter process is executed for the original image. After the low-pass-filter process, the processed original image is written in a data ROM as the information image. When a digital camera is operated, the information image is displayed on a screen of the liquid crystal display by using the data of the information image stored in the data ROM.

13 Claims, 8 Drawing Sheets

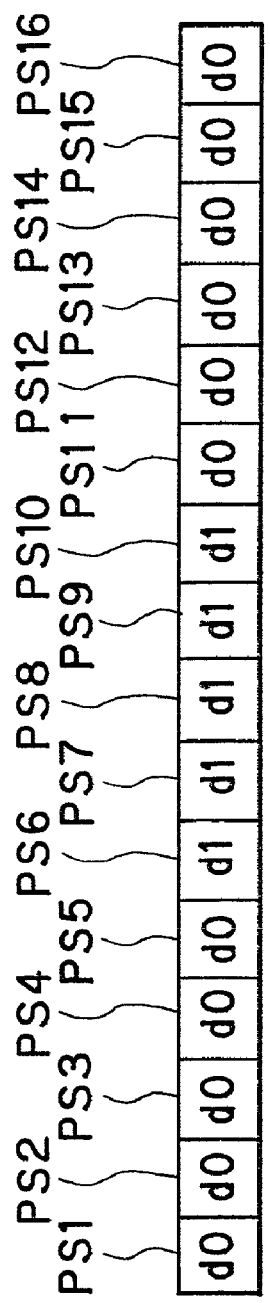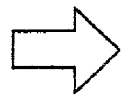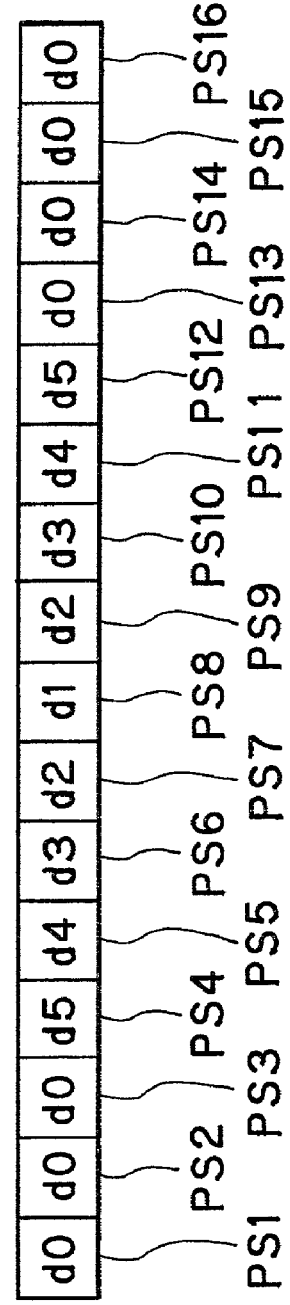
FIG. 7A
FIG. 7B

METHOD FOR DISPLAYING AN INFORMATION IMAGE ON A SCREEN

BACKGROUND OF THE INVENTION

1. Field of the Invention

The present invention relates to a method for displaying an information image on a screen, and more particularly to a method for displaying a letter, an icon and so forth on a liquid crystal display in order to guide an operation.

2. Description of the Related Art

A digital camera is familiarized. In such a digital camera, an image is taken by an image sensor, for instance, by a CCD image sensor. The taken image is digitally converted into image data to be stored in a storage medium of a memory card and so forth. Almost all of the digital cameras are provided with a liquid crystal display (hereinafter LCD) for displaying the image as a moving image. The LCD is also used for reproducing the image stored in the memory card or the like.

A pixel number of the digital camera for taking a picture is extremely improved. Meanwhile, the digital camera is restricted regarding its size so that it employs the LCD having a small size. A pixel number of the LCD for displaying an image is fairly small in comparison with the pixel number at the time of taking the image. Thus, when the image taken by the image sensor is displayed on the LCD, a process for thinning pixels is executed in both of a horizontal direction and a vertical direction.

In addition to the above image, the LCD displays letters, icons and so forth on a screen thereof as an information image. This information image shows various setting information of the digital camera, information about photographing, and information for guiding an operation. The information image displayed on the screen is produced in accordance with contents to be displayed. The produced information image is previously written as data in a storage element of a ROM, for instance, and is read out of this storage element as occasion demands.

By the way, when the letters and the icons of the information image are designed in accordance with the small pixel number of the LCD so as to be properly displayed, the pixels necessary for displaying the letters and the icons are likely to occupy a large proportion of the whole pixels of the LCD. In this case, there arise problems in that numbers of the letters and the icons simultaneously displayed on the LCD are reduced, and in that almost all of the image is covered with the letters and the icons.

In the meantime, when the letters and the icons of the information image are designed in accordance with the pixel number of the taken image, it is possible to design the letters and the icons with a large number of pixels. In this case, however, when displaying the letters and the icons of the information image on the LCD, it is required to execute the above-mentioned process for thinning the pixels. Due to the pixel thinning process, the letter and the icon are likely to wane. Consequently, the letter and the icon are unnaturally and obscurely displayed. Especially, when the LCD is directly driven by the image data, such influence remarkably appears.

SUMMARY OF THE INVENTION

In view of the foregoing, it is a primary object of the present invention to provide a displaying method in which an information image is displayed on a screen of a liquid crystal display in good conditions, although a pixel number of the liquid crystal display is small.

It is a second object of the present invention to provide a displaying method in which an information image is displayed on a screen of a liquid crystal display in good conditions, although a pixel thinning process is executed in accordance with a pixel number of the liquid crystal display.

In order to achieve the above and other objects, the displaying method according to the present invention comprises a step of executing a low-pass-filter process.

First of all, an original image of the information image is produced in accordance with a pixel number of an image to be displayed. For this original image, the low-pass-filter process is executed to obtain the information image. The obtained information image is stored in a storage element and is read therefrom to be displayed on the screen of the liquid crystal display. When displaying the information image on the screen, a process for thinning pixels constructing the information image is executed.

When the low-pass-filter process is executed for the original image of the information image, a tap number used in the low-pass-filter process is greater than a maximum number for thinning the pixels in the pixel thinning process.

In a preferred embodiment, letters etc. included in the original image of the information image are arranged at certain intervals so as not to affect each other after the low-pass-filter process.

As stated above, according to the present invention, the low-pass-filter process is executed for the original image of the information image produced in accordance with the pixel number of the image to be displayed. After the low-pass-filter process, the processed original image is stored in the storage element as the information image. Although the pixel thinning process is executed for the information image, the information image is displayed on the screen of the liquid crystal display in good conditions.

BRIEF DESCRIPTION OF THE DRAWINGS

The above objects and advantages of the present invention will become apparent from the following detailed description of the preferred embodiments of the invention when read in conjunction with the accompanying drawings, in which:

FIGS. 7A and 7B are explanatory illustrations for explaining a low-pass-filter process.

DETAILED DESCRIPTION OF THE PREFERRED EMBODIMENT (S)

Figure 1:
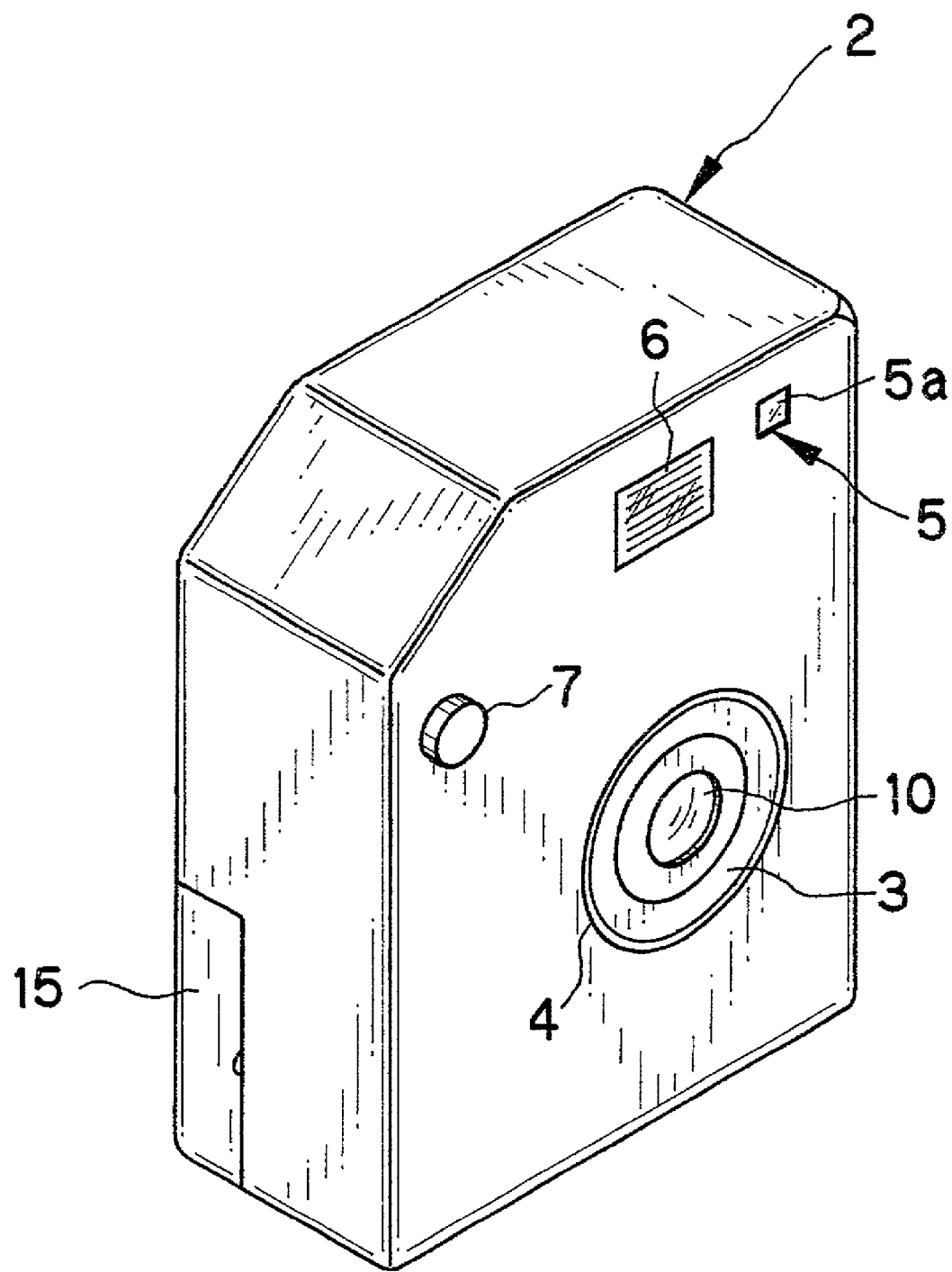
FIG. 1 is a front perspective view showing a digital camera.
Figure 2:
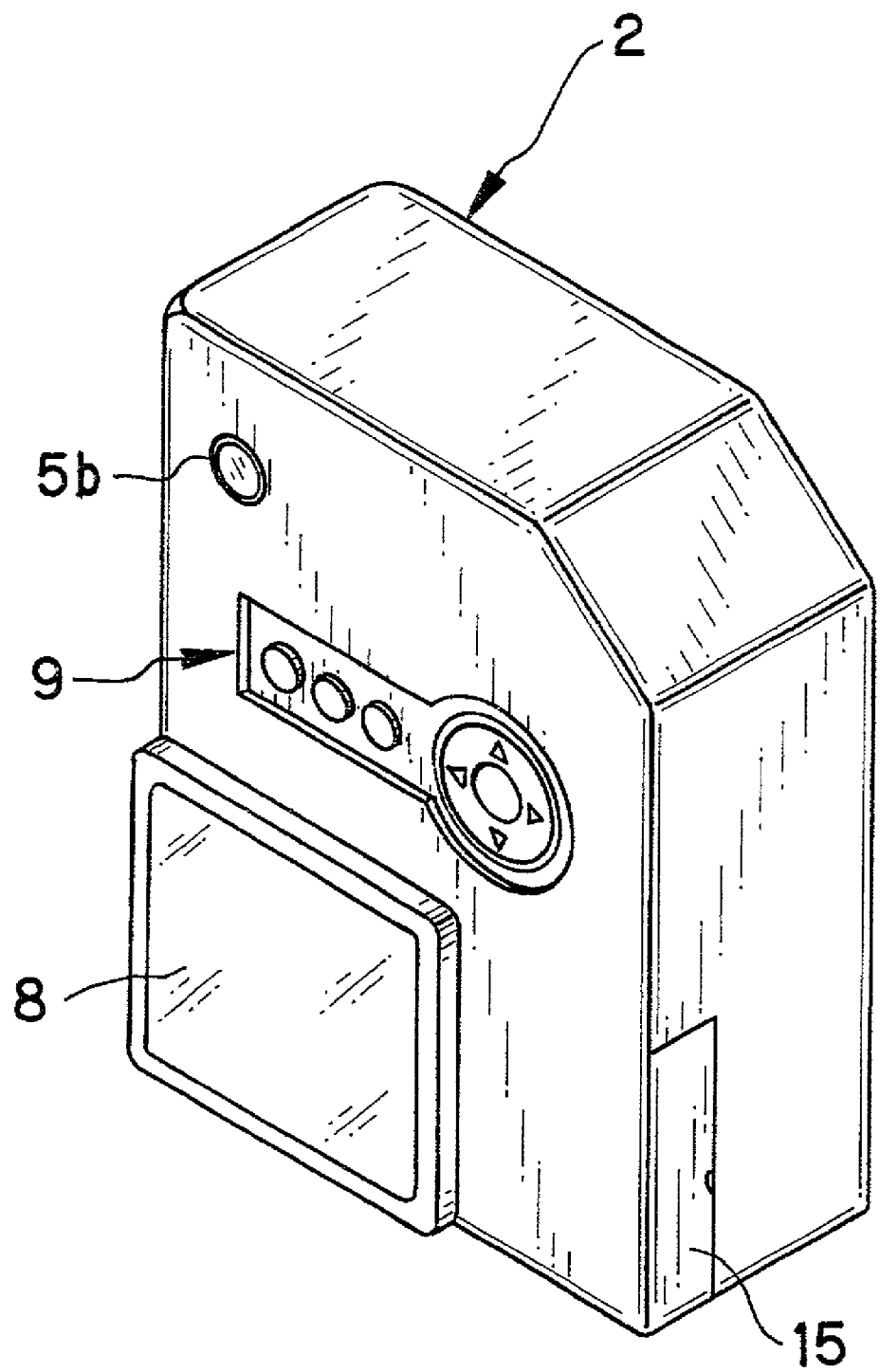
FIG. 2 is a rear perspective view showing the digital camera.

FIGS. 1 and 2 respectively show a front side and a rear side of a digital camera to which the present invention is applied. A front face of a camera body 2 is provided with an opening 4 through which a lens barrel 3 protrudes, an objective window 5a of an optical viewfinder 5, a flash window 6, and a release button 7. A rear face of the camera body 2 is provided with an eye-piece window 5b of the viewfinder 5, an LCD 8, and an operating portion 9.

The lens barrel 3 contains a taking lens 10. When a power switch of the digital camera is turned on with the operating section 9, the lens barrel 3 is protruded from a collapsible-mount position shown in FIG. 1 toward a taking position projecting forward. Upon depressing the release button 7, a subject image of one frame to be taken is introduced by a CCD image sensor 12 (see FIG. 5) disposed behind the taking lens 10. Data of the obtained image is stored in a memory.

Besides turning on and off the power switch, it is possible by using the operating portion 9 to change a photographing mode and a reproducing mode, and to select the subject image for reproduction, and to erase the image data.

By watching through the viewfinder 5, a photographic scope may be confirmed. The LCD 8 constitutes an electronic viewfinder for displaying the subject image, which is taken through the lens 10, in real time. In addition, the LCD 8 is utilized for reproducing the subject image read from the memory.

Figure 3:
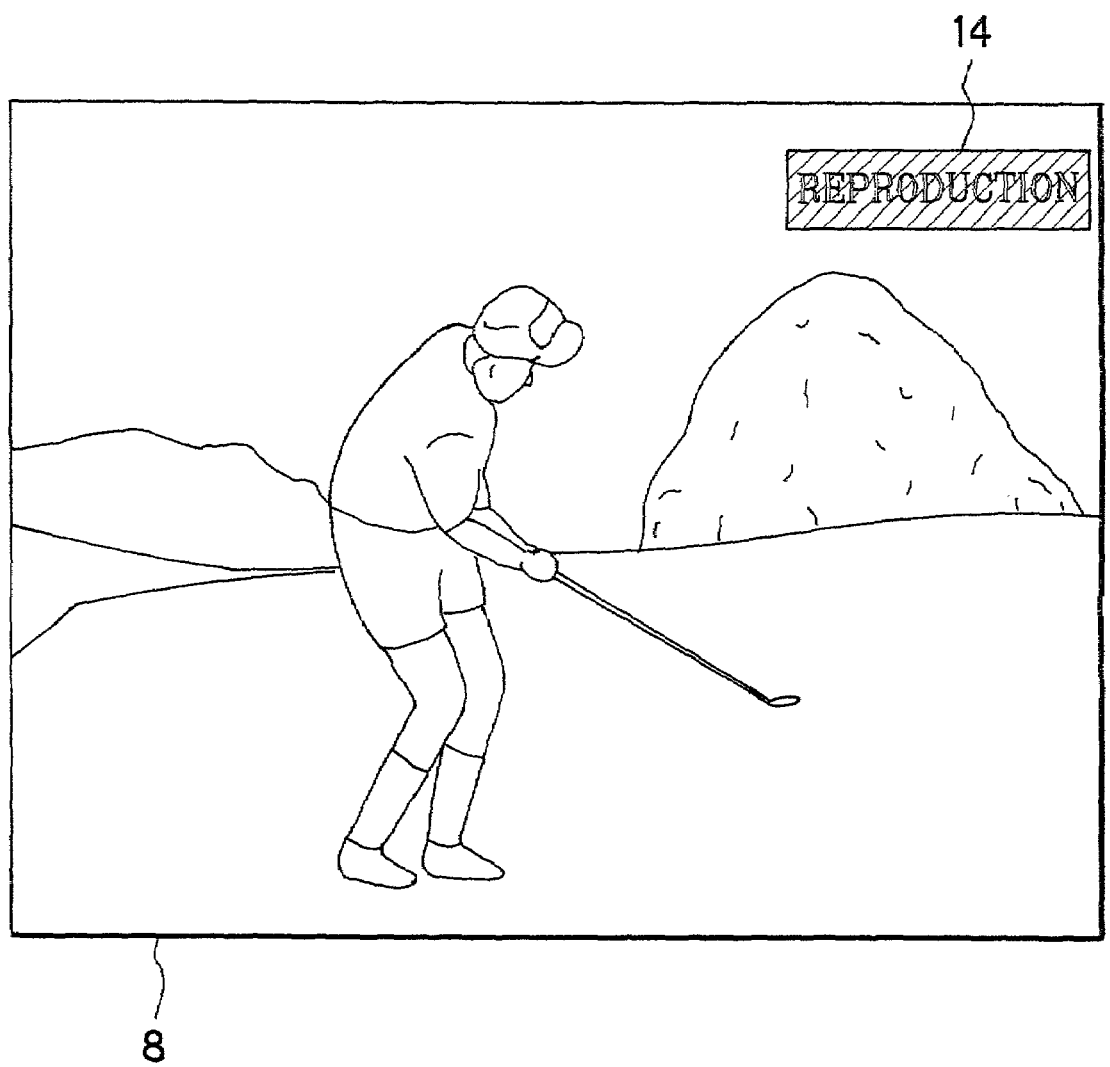
FIG. 3 is an explanatory illustration showing an information image displayed on a screen.

For example, as shown in FIG. 3, the LCD 8 displays an information image 14 on a screen thereof. The information image 14 is displayed in order to inform a user about various setting information of the digital camera, photographic conditions, and guidance for the operation. The information image 14 is displayed, for instance, in a state that white letters are arranged in a black display area. When a certain image is displayed on the LCD 8, the information image 14 is displayed so as to be overlapped on the certain image.

When photographing is performed with the CCD image sensor 12, the obtained subject image has 1,280 pixels in a horizontal direction and has 1,024 lines in a vertical direction, for example. Meanwhile, the LCD 8 displays the subject image having 480 pixels in the horizontal direction and having 384 lines in the vertical direction. In other words, the subject image is taken with the 1,280×1,024 pixels by means of the CCD image sensor 12, and the taken subject image is thinned to be displayed on the LCD 8 with the 480×384 pixels.

A lid 15 is provided on the side of the camera body 2 so as to be openable. By opening the lid 15, a memory card may be attached to a memory slot and may be removed therefrom. When the memory card is attached, it is possible to store the taken image in the memory card. Normally, the image is saved in a flash memory incorporated in the camera body 2.

Figure 4:
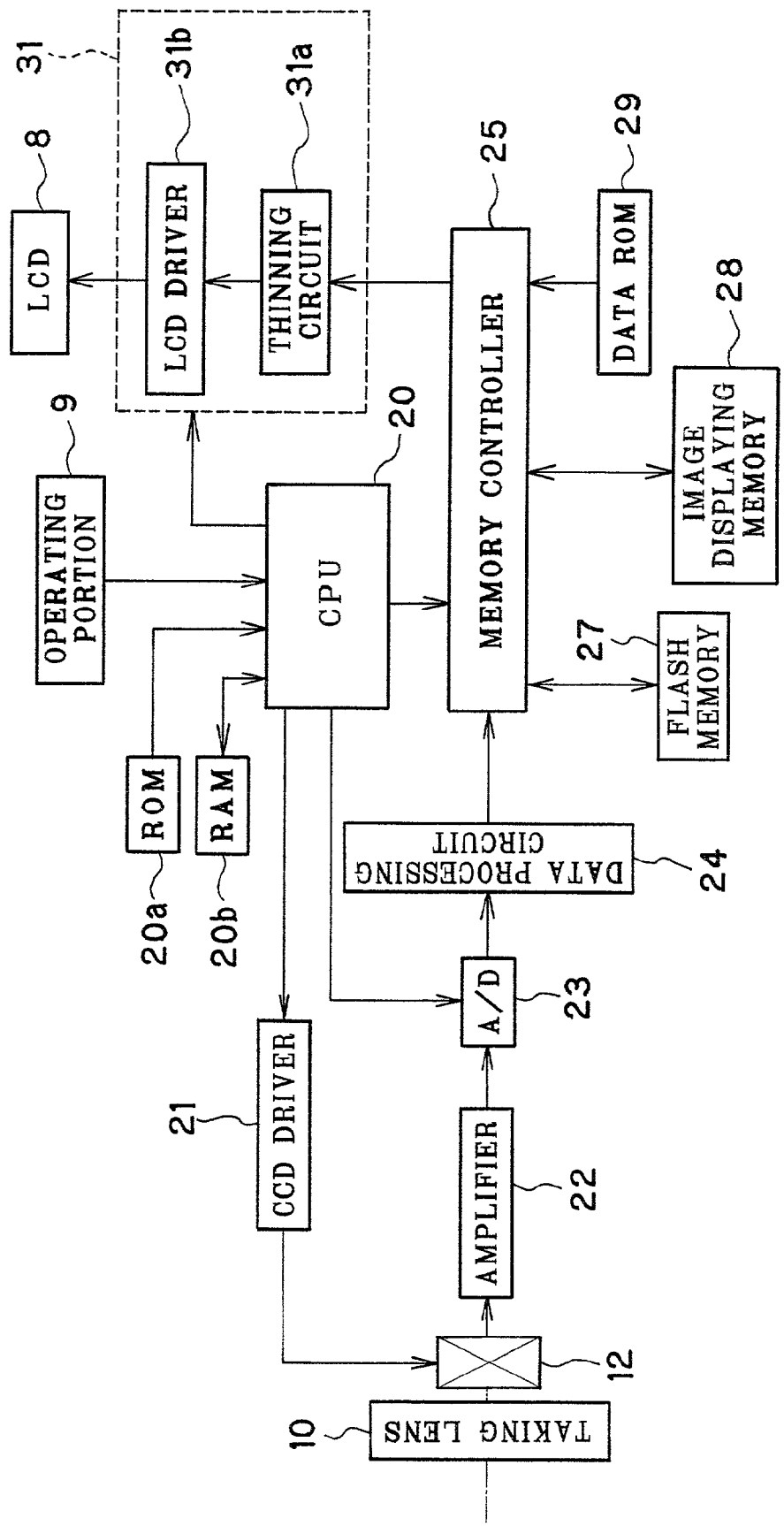
FIG. 4 is a block diagram showing a structure of the digital camera.

FIG. 4 schematically shows an electrical structure of the digital camera. A CPU 20 controls each section of the digital camera in response to an operation signal sent from the operating portion 9. In a ROM 20a, are stored a program, parameters, and so forth of a control sequence for the digital camera. The CPU 20 executes the sequence based on the program. A RAM 20b is used as a work area temporarily storing the data which are necessary for executing various sequences.

Bringing the taking lens 10 into focus is performed by an automatic focusing mechanism which is not shown. The CCD image sensor 12 is disposed behind the taking lens 10. The CCD image sensor 12 is driven by a CCD driver 21 to convert the optical subject image into an electrical image signal. A light receiving face of the CCD image sensor 12 is provided with micro color filters of R, G and B arranged in matrix. The image signal serially outputted every color is amplified up to a proper level with an amplifier 22. After that, the image signal is digitally converted into respective image data of red, green and blue, by means of an A-D converter 23.

A data processing circuit 24 performs white-balance adjustment, gamma correction, and so forth relative to the image data outputted from the A-D converter 23. In addition, the data processing circuit 24 executes an interpolation process for the respective image data of red, green and blue to produce the image data of each color corresponding to 1,280×1,024 pixels. The produced image data are sent to a memory controller 25.

The memory controller 25 performs data reading and data writing relative to each of a flash memory 27, an image displaying memory 28 and a data ROM 29, in response to instructions of the CPU 20. The flash memory 27 stores the image data of one frame written via the memory controller 25 upon depression of the release button 7. The flash memory 27 is capable of storing the image data corresponding to twenty frames, for example.

In the image displaying memory 28, the one-frame image data outputted from the data processing circuit 24 is written and is updated while pictures are taken. At the same time, the image data is read in order. The image data read out of the image displaying memory 28 is sent from the memory controller 25 to an LCD driving section 31. Upon this, the subject image is displayed on the LCD 8 as a moving image while photographing is performed. In the meantime, at the time of reproduction, the image data of the subject image selected through the operating portion 9 is written in the image displaying memory 28. Successively, the written image data of one frame is read from the image displaying memory 28 to be sent to the LCD driving section 31 via the memory controller 25. Owing to this, the selected subject image is displayed on the LCD 8 as a still image.

With respect to the information image displayed on the screen, are prepared letters of "TAKING" and "REPRODUCTION", for instance. The information image is converted into data to be written in the data ROM 29 beforehand. The information image is read from the data ROM 29 as occasion demands, and is written in a display area of the image displaying memory 28. The memory controller 25 reads the data of the information image from the image displaying memory 28 instead of the subject-image data corresponding to a region of the information image. The read data is sent to the LCD driving section 31. Owing to this, the LCD 8 displays the subject image with which the information image is composed.

The LCD driving section 31 is constituted of a thinning circuit 31a and an LCD driver 31b. The thinning circuit 31a executes a thinning process for the one-frame data read from the image displaying memory 28. The thinning process is executed in order to adjust the pixel number of the one-frame subject image, which is taken by the CCD image sensor 12, to the pixel number of the LCD 8. The thinning process is executed such that the line is removed concerning the vertical direction of the image and the pixel is removed concerning the horizontal direction thereof. The thinning process is similarly executed by the thinning circuit 31a when the information image is composed with the subject image.

The image of one frame taken by the CCD image sensor 12 has 1,280 pixels in the horizontal direction and is displayed on the LCD 8 with 480 pixels. In view of this, the 1,280 pixels are thinned at a proper rate one pixel by one pixel. The 1,280 pixels may be thinned two pixels by two pixels being adjacent. Meanwhile, the taken image has 1,024 lines in the vertical direction and is displayed on the LCD 8 with 384 lines so that the 1,024 lines are thinned at a proper rate one line by one line. The 1,024 lines may be thinned two lines by two lines being adjacent.

The LCD driver 31*b* actuates the LCD 8 based on the image data for which the thinning process has been executed by the thinning circuit 31*a*. In this way, the taken subject image is displayed on the LCD 8 with the information image or without it.

Figure 5:
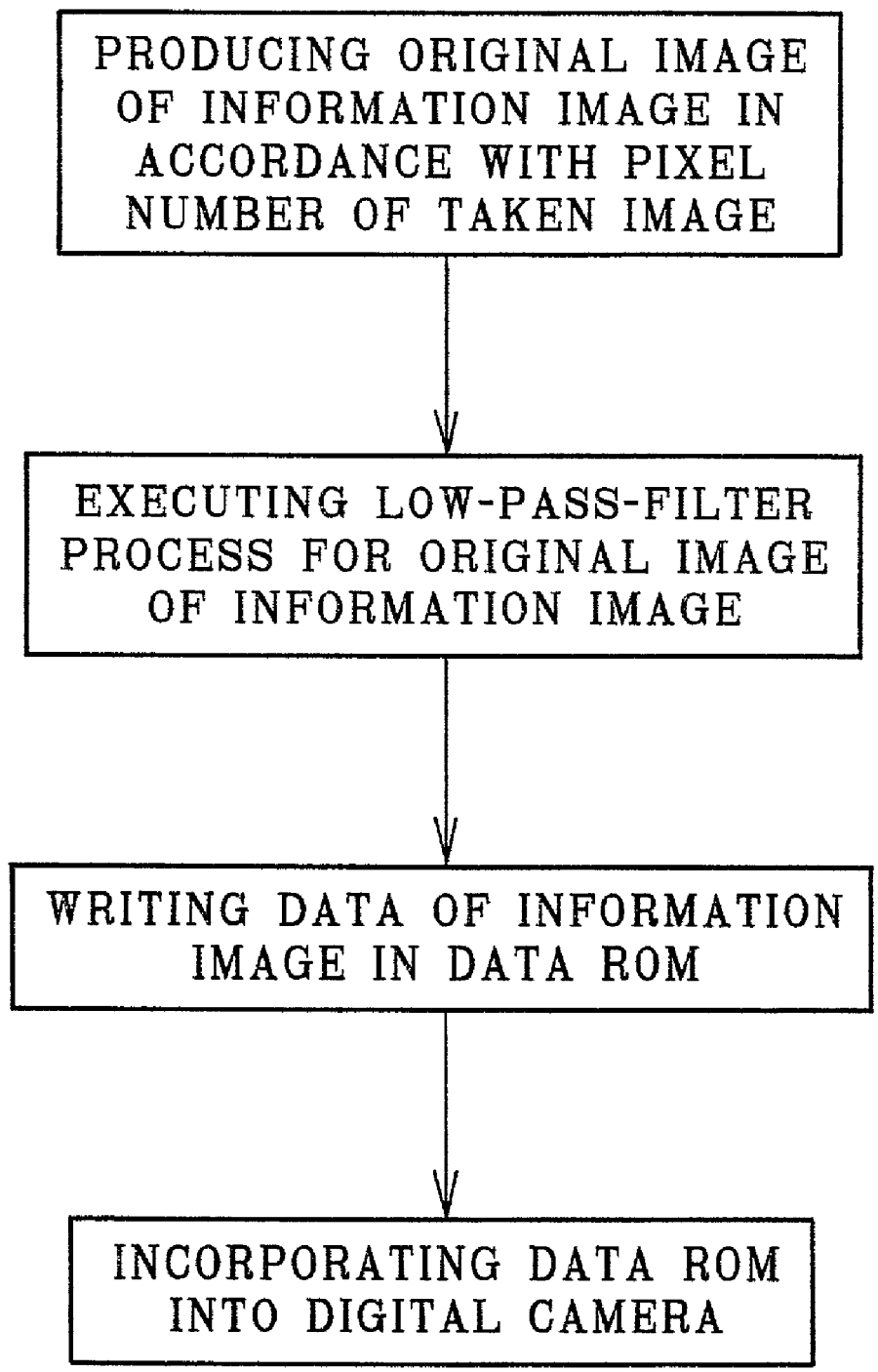
FIG. 5 is a flow chart showing a sequence for drawing up the information image.

FIG. 5 shows a process for drawing up the information image to be displayed on the screen. Arrangement of the pixels constructing the letters of the information image is designed in accordance with the pixel number of the taken subject image (hereinafter, the designed one is called as an original image). Thus, the original image is produced on condition that it is displayed on the screen of 1,280×1,024 pixels. If the thinning process is directly executed for the original image, the letter thereof is caused to wane due to this thinning process. In order to prevent the letter from waning, a low-pass-filter process is executed for the original image. Data obtained after the low-pass-filter process is stored in the data ROM 29 as the information image.

In the present embodiment, the low-pass-filter process is executed such as described below. A target pixel is set in a certain line of the original image. Regarding the target pixel and the adjacent pixels thereof, a brightness level of each pixel is multiplied by a prescribed coefficient. Incidentally, the adjacent pixels of the target pixel are set at horizontal both sides thereof, and a number of which is predetermined. The multiplied brightness levels are summed up to obtain a total value which is regarded as the new brightness level of the target pixel. By the way, the number of the pixels including the target pixel and used for obtaining the brightness level of one pixel is defined as a tap number. This tap number used in the low-pass-filter process is greater than a maximum thinning number used in the thinning process. The maximum thinning number is a maximum number of the continuous pixels simultaneously removed in the thinning process. In this case, the maximum thinning number is "2".

In the present embodiment, the low-pass-filter process is executed under conditions that the tap number is "5" and the coefficients k1 to k5 are "0.2". When the brightness level of the target pixel is represented by d(i) and the brightness levels of the adjacent four pixels are respectively represented by d(i+1), d(i+2), d(i−1) and d(i−2), the brightness level D of the target pixel after the low-pass-filter process is obtained from the following formula.

$$D = k1 \cdot d(i) + k2 \cdot d(i+1) + K3 \cdot d(i+2) + k4 \cdot d(i-1) + k5 \cdot (i-2)$$

The low-pass-filter process is executed in the above way to draw up the information image displayed on the screen. The brightness level of each pixel of the information image is converted into the image data of red, green and blue so as to conform with the data format of the taken image. The converted image data is written in the data ROM 29.

In the above, for the purpose of simplifying the description, the information image is displayed in the state that the white letters are arranged in the black display area. Further, in the above, the low-pass-filter process is executed by utilizing the brightness level. The data of the information image, however, may be produced by using the image data of red, green and blue without utilizing the brightness level.

In the above embodiment, the low-pass-filter process is executed only in the horizontal direction to produce the data of the information image, since the thinning process in the vertical direction hardly affects the display state of the letter. Nevertheless, the low-pass-filter process may be executed in the vertical direction.

Upon executing the low-pass-filter process, the number of the pixels for constructing the letter is increased in the horizontal direction by an amount corresponding to the tap number. When the low-pass-filter process is executed at a burst in a state that the adjacent letters of the original image are closely arranged, the brightness levels of the respective pixels of the adjacent letters are likely to affect each other. Sometimes the pixel having the comparatively high brightness level is unexpectedly generated. In order to prevent this, intervals of the letters of the original image are determined such that the letters are separated at least by an amount corresponding to the tap number. Concretely, it is preferable to arrange the letters of the original image so as to be separated more far than the pixels of the tap number. Further, in order to prevent the adjacent letters from being connected when executing the thinning process, longer pixel intervals may be provided to arrange the respective letters of the original image.

Next, an operation of the above structure is described below. As shown in FIG. 5, when the data of the information image to be stored in the data ROM 29 is drawn up, the various original images are produced first in accordance with the pixel number of the one-frame image. The original images are produced by using a device for drawing up the information image, for instance, by using a computer.

Figure 6A:
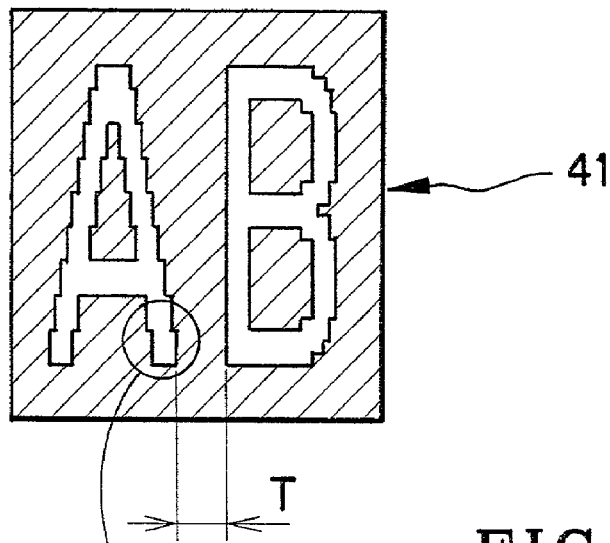
FIGS. 6A and 6B are explanatory illustrations showing an original image of the information image.
Figure 6B:
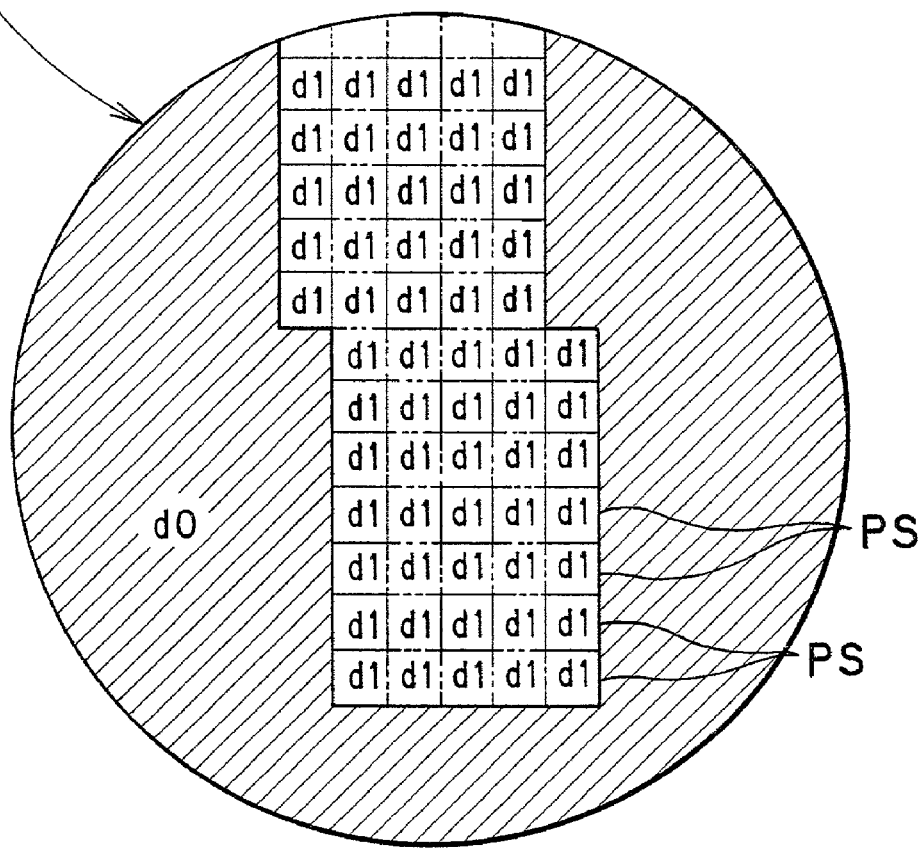

FIGS. 6A and 6B show a certain original image 41 from which an information image of letters "AB" is obtained. The many pixels arranged in matrix are allocated to the original image 41. The pixels PS constructing the respective letters "A" and "B" possess the brightness level d1 corresponding to a white level. The other pixels possess the brightness level d0 corresponding to a black level. For instance, a value of data corresponding to the brightness level d1 is defined as "1.0", and a value of data corresponding to the brightness level d0 is defined as "0". Incidentally, an area except for the pixels PS is also constructed from a large number of pixels. These pixels, however, are not shown in order to avoid complexity of the drawing.

The pixel number allocated to the single original image is determined in accordance with the pixel number of the taken image (1,280×1,024 pixels). Moreover, the pixel numbers corresponding to the height and the width of each letter are also determined in accordance with the pixel number of the taken image. Further, arrangement of the pixels is also determined in accordance with the pixel number of the taken image. Meanwhile, the letters "A" and "B" are designed so as to be arranged such that an interval T between them corresponds to at least five pixels.

For the original image produced in the above way, the following low-pass-filter process is executed. FIG. 7 shows an example in that the brightness level is changed by the low-pass-filter process. FIG. 7A shows a former state of the low-pass-filter process, and FIG. 7B shows a latter state thereof.

Such as shown in FIG. 7, the pixels PS1 to PS16 having the brightness level d1 or d0 are arranged in the horizontal direction on the original image. The brightness levels of the pixel PS8 and its adjacent four pixels PS6, PS7, PS9 and PS10 are d1 (=1.0) so that the brightness level of the pixel PS8 becomes d1 after the low-pass-filter process.

As to the pixel PS7, the brightness level thereof and of the adjacent pixels PS6, PS8, and PS9 are d1, and the brightness level of the pixel PS5 is d0 (=0). Thus, after the low-pass-filter process, the brightness level of the pixel PS7 becomes d2 (=0.8) which is smaller than d1. As to the pixel PS6, the brightness level thereof and of the adjacent pixels PS7 and PS8 are d1, and the brightness levels of the pixels PS4 and PS5 are d0 (=0). Accordingly, after the low-pass-filter process, the brightness level of the pixel PS6 becomes d3 (=0.6) which is smaller than d2.

The brightness level of the pixel PS5 is d0 so that the pixel PS5 does not form the letter on the original image. However, after the low-pass-filter process, the brightness level of the pixel PS5 becomes d4 (=0.4) to form the letter, because the brightness levels of the pixels PS6 and PS7 are d1 and the brightness levels of the pixels PS3 and PS4 are d0. Similarly, although the brightness level of the pixel PS4 is d0, the brightness level thereof becomes d5 (=0.2) after the low-pass-filter process. With respect to the pixel PS3, the brightness levels thereof and of the adjacent pixels PS1, PS2, PS4 and PS5 are d0 so that the brightness level is kept at d0 without changing after the low-pass-filter process. The pixels PS8 to PS16 are similarly processed.

Figure 8A:
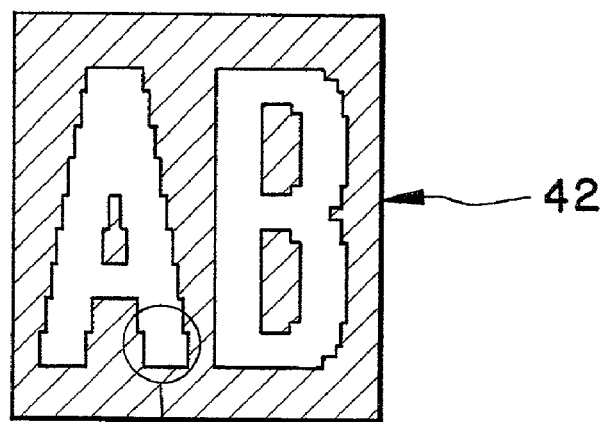
FIGS. 8A and 8B are explanatory illustrations showing the information image for which the low-pass-filter process has been executed.
Figure 8B:
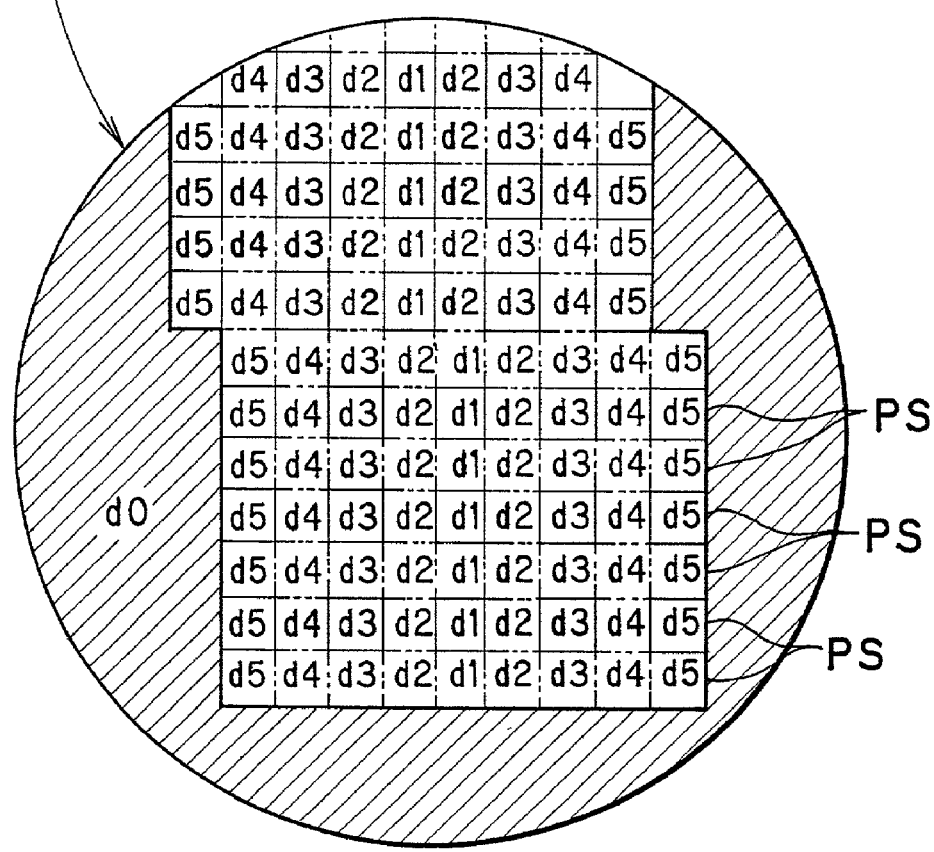

As a result, after the low-pass-filter process has been executed for the original image 41 shown in FIG. 6, the brightness levels of the pixels constructing the letters of the original image 41 are converted into the brightness levels d1 to d5 in accordance with the brightness levels of the adjacent pixels, such as shown in FIG. 8. At the same time, owing to the pixels of the brightness levels d4 and d5, the width of the letter is broadened in the horizontal direction by two pixels at the both sides thereof. Hence, an information image 42 having a form shown in FIG. 8B is drawn up. Although the width of the letter is broadened, the letter is not affected by the brightness level of the other letter in the low-pass-filter process, since the letters are arranged in consideration of the extension of the letter. Moreover, the adjacent letters are not connected with each other after the low-pass-filter process.

The various information images are drawn up in the above way, and the brightness level of each pixel thereof is converted into the image data of red, green and blue to be respectively written in the data ROM 29. This data ROM 29 is incorporated into the digital camera. The data of the information image for which the low-pass-filter process has been executed is stored in the data ROM 29 so that it is unnecessary to provide a circuit for the low-pass-filter process in the digital camera.

Under the photographing mode, the image data of the subject image taken by means of the CCD image sensor 12 is continuously sent to the data processing circuit 24. The processed image data of the 1,280×1,024 pixels is written in the image displaying memory 28 via the memory controller 25. Then, the image data is read to be sent to the LCD driving section 31.

For the image data sent to the LCD driving section 31, the thinning process is executed by the thinning circuit 31a relative to both the directions of the vertical direction and the horizontal direction. Owing to the thinning process, the image data of one frame is adapted to correspond to the 480×384 pixels. The image data for which the thinning process has been executed is sent to the LCD driver 31b for driving the LCD 8 based on the inputted image data. Thus, the taken subject image is displayed on the LCD 8 as a moving image with the 480×384 pixels.

A photographer performs framing, watching the LCD 8 or watching through the viewfinder 5, and presses the release button 7. Upon depression of the release button 7, the image data of one frame taken at this time is written in the flash memory 27 via the memory controller 25 in response to an instruction of the CPU 20. If the memory card is selected as a storage place, the image data is stored therein.

Under the reproducing mode, when the subject image stored in the flash memory 27 or in the memory card is selected with the operating portion 9, the image data of this one-frame image is read from the flash memory 27 or from the memory card to be written in the image displaying memory 28. After that, the image data of the 1,280×1,024 pixels is sequentially read out of the image displaying memory 28. The read image data is sent to the LCD driving section 31 to display the selected image on the LCD 8 as a still image. In the reproducing mode, the thinning process is also executed by the thinning circuit 31a in both the directions of the vertical direction and the horizontal direction. Thus, the still image is displayed on the LCD 8 with the 480×384 pixels.

In both of the photographing mode and the reproducing mode, the instruction of the CPU 20 is given to the memory controller 25 when the information image is displayed on the screen of the LCD 8. The data of the information image to be displayed is read from the data ROM 29 and is written in the display area of the image displaying memory 28.

As an example, a letter series "REPRODUCTION" for representing the reproducing mode is displayed as the information image. In this case, the data of the information image corresponding to the above-noted letter series is read from the data ROM 29 to be written in the display area of the image displaying memory 28.

When the information image is displayed, the memory controller 25 sequentially reads the image data of the subject image from the image displaying memory 28, similarly to the foregoing. With respect to the region where the information image is displayed, the image data of the respective colors of the information image are read instead of the image data of the subject image. The read image data are sent to the LCD driving section 31.

In this way, the subject image and the information image are compounded to form a composite image. Data of the composite image is inputted into the LCD driving section 31 to be thinned by the thinning circuit 31a. Based on the thinned data of the composite image, the LCD 8 is driven. Consequently, the thinning process is executed for the information image as well.

Such as shown in FIG. 3, for example, the subject image is displayed as the still image in which the information image 14 including the letters of "REPRODUCTION" is displayed within the black region. At this time, the pixel remaining after the thinning process is displayed at the brightness level (gradation) given thereto.

The thinning process is executed for the information image to be displayed on the LCD 8. This thinning process is adapted to be executed relative to the information image for which the low-pass-filter process has been executed according to the tap number greater than the maximum thinning number. Owing to this, the letter of the information image is prevented from waning so that the letter is kept in a recognizable state. Further, the letter is prevented from being displayed in an unnatural form. Thus, the information is correctly notified to a user without a strange feeling.

Incidentally, the ROM for storing the data of the information image may be also used as a ROM storing a program of control sequence, parameter, and so forth.

In the foregoing embodiment, the information image is displayed in the monochrome state including a middle tone. The information image, however, may be colored. In a conventional way, when the information image is colored, a part of the information image is sometimes displayed in a different color in comparison with the original image due to the thinning process. However, such a problem may be prevented.

Moreover, in the above-described embodiment, the information image has the style in that the white letters are displayed within the black display region. However, only the letters may be displayed. Besides the letter, it is possible to display a mark and a figure called icon. Further, the present invention may be applicable to the other apparatus using the LCD.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An information-image displaying method for displaying an information image on a screen of a liquid crystal display in order to give a photographer information, said displaying method being used for an apparatus in which a taken subject image is displayed on said liquid crystal display after a thinning process has been executed in accordance with a screen pixel number of said liquid crystal display, said displaying method comprising the steps of:
   producing an original image of said information image in accordance with a primary pixel number of said subject image;
   executing a low-pass-filter process for said original image to obtain said information image, said low-pass-filter process performing an operation process relative to data of original pixels of said original image to calculate data of each pixel of said information image;
   storing said information image in storage means;
   reading said information image from said storage means; and
   displaying said information image on said screen of said liquid crystal display after said thinning process,
   wherein during the operation process the original pixel to be process and the adjacent (N−1) original pixels thereof are each multiplied by a predetermined coefficient and summed up, wherein said "N" is a natural number more than "3",
   wherein a brightness level of each pixel of said information image is calculated in said low-pass-filter process,
   wherein the brightness level after the low-pass-filter process is obtained from the following formula:

$D = k1 \cdot d(i) + k2 \cdot d(i+1) + K3 \cdot d(i+2) + k4 \cdot d(i-1) + k5 \cdot d(i-2)$, wherein k1 to k5 are "0.2" and the brightness level of a target pixel is represented by d(i) and the brightness levels of the adjacent (N−1) pixels are respectively represented by at least d(i+1), d(i+2), d(i−1) and d(i−2),
   wherein the original pixel to be processed and the adjacent (N−1) original pixels thereof represent a tap number,
   wherein said original image includes a plurality of elements, said elements being separated at least by an amount corresponding to said tap number after producing said original image.

2. An information-image displaying method according to claim 1, wherein said N is greater than a maximum thinning number used in said thinning process.

3. An information-image displaying method according to claim 1, wherein said original image includes a plurality of elements comprising a letter, a mark and a figure, said elements being arranged at intervals so as to avoid affecting each other after said low-pass-filter process.

4. An information-image displaying method according to claim 3, wherein said interval corresponds to the original pixels whose number is at least five.

5. An information-image displaying method according to claim 1, wherein said low-pass-filter process is executed relative to a horizontal direction of said original image.

6. An information-image displaying method according to claim 1, wherein said N is "5" containing the original pixel to be processed and two original pixels of each side thereof.

7. An information-image displaying method according to claim 1, wherein said storage means is a data ROM.

8. An information-image displaying method according to claim 7, wherein said information image read from said data ROM is composed with said subject image to be displayed on said liquid crystal display.

9. An information-image displaying method according to claim 1, wherein said information image is displayed in a right-upper corner of said subject image.

10. An information-image displaying method according to claim 9, wherein said information image is displayed in a state that white letters are arranged in a black region.

11. An information-image displaying method according to claim 1, wherein said apparatus is a digital camera.

12. An information-image displaying method according to claim 1, wherein said liquid crystal display is provided on a rear face of said digital camera.

13. An information-image displaying method for displaying an information image on a screen of a liquid crystal display in order to give a photographer information, said displaying method being used for an apparatus in which a taken subject image is displayed on said liquid crystal display after a thinning process has been executed in accordance with a screen pixel number of said liquid crystal display, said displaying method comprising the steps of:
   producing an original image of said information image in accordance with a primary pixel number of said subject image;
   executing a low-pass-filter process for said original image to obtain said information image, said low-pass-filter process performing an operation process relative to data of original pixels of said original image to calculate data of each pixel of said information image;
   storing said information image in storage means;
   reading said information image from said storage means; and
   displaying said information image on said screen of said liquid crystal display after said thinning process,
   wherein during the operation process the original pixel to be process and the adjacent (N−1) original pixels thereof are each multiplied by a predetermined coefficient and summed up, wherein said "N" is a natural number more than "3",
   wherein a brightness level of each pixel of said information image is calculated in said low-pass-filter process,
   wherein the original pixel to be processed and the adjacent (N−1) original pixels thereof represent a tap number,
   wherein said original image includes a plurality of elements, said elements being separated at least by an amount corresponding to said tap number after producing said original image.

* * * * *